(12) United States Patent
Kakutani et al.

(10) Patent No.: US 6,859,684 B2
(45) Date of Patent: Feb. 22, 2005

(54) METHOD OF CONTROLLING TABLE ANGLE OF TRANSPORT ROBOT

(75) Inventors: Kazushige Kakutani, Hirakata (JP); Shin Miyaji, Kobe (JP); Naoto Tojo, Ikoma (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 59 days.

(21) Appl. No.: 10/462,701

(22) Filed: Jun. 17, 2003

(65) Prior Publication Data

US 2004/0006408 A1 Jan. 8, 2004

(30) Foreign Application Priority Data

Jun. 18, 2002 (JP) ........................ 2002-176996

(51) Int. Cl.[7] ................. G05B 15/00; G05B 19/00
(52) U.S. Cl. ................. 700/262; 700/213; 700/245; 700/258
(58) Field of Search ................. 700/245, 213, 700/258, 250–252, 254, 262; 369/44.15, 44.14; 83/471.3, 503; 318/571, 696; 399/208

(56) References Cited

U.S. PATENT DOCUMENTS

| 4,657,104 A | * | 4/1987 | Holland | ................. 180/211 |
|---|---|---|---|---|
| 5,720,213 A | * | 2/1998 | Sberveglieri | ................. 83/471.3 |
| 5,819,625 A | * | 10/1998 | Sberveglieri | ................. 83/471.3 |
| 5,974,348 A | * | 10/1999 | Rocks | ................. 701/28 |
| 6,612,100 B1 | * | 9/2003 | Morimoto et al. | ................. 53/540 |

OTHER PUBLICATIONS

Canny et al., A RISC approach to sensing adn manipulation, 1995, Internet, pp. 1–12.*

* cited by examiner

*Primary Examiner*—Gary Chin
*Assistant Examiner*—McDieunel Marc
(74) *Attorney, Agent, or Firm*—Armstrong, Kratz, Quintos, Hanson & Brooks, LLP

(57) ABSTRACT

A table angle controlling method capable of effectively preventing an article placed on a table (20), from falling off by tilting the table so that the synthetic vector of horizontal acceleration and gravitational acceleration which act on the table acts on the table perpendicular thereto. The method has the steps of measuring the synthetic vector of horizontal acceleration and gravitational acting on the table (20) or a carriage (11) with the movement of the carriage (11), and tilting the table so that the synthetic vector obtained acts on the table perpendicular thereto. Alternatively the method has the steps of estimating acceleration acting on the table from a speed command value input to drive device for the carriage (11) for moving the carriage, calculating the synthetic vector of the estimated horizontal acceleration and gravitational acceleration, and tilting the table so that the synthetic vector obtained acts on the table perpendicular thereto.

4 Claims, 19 Drawing Sheets

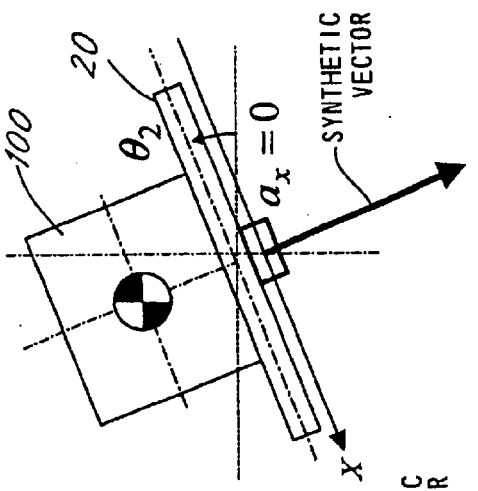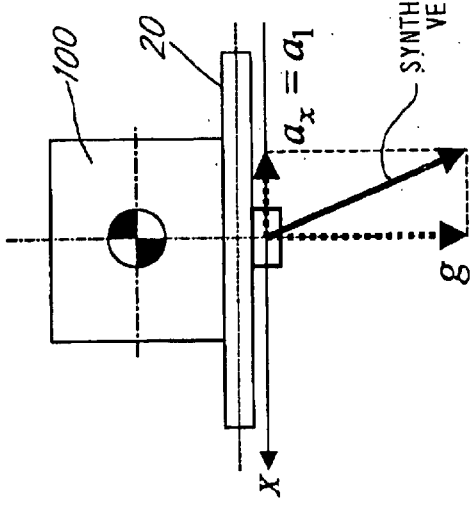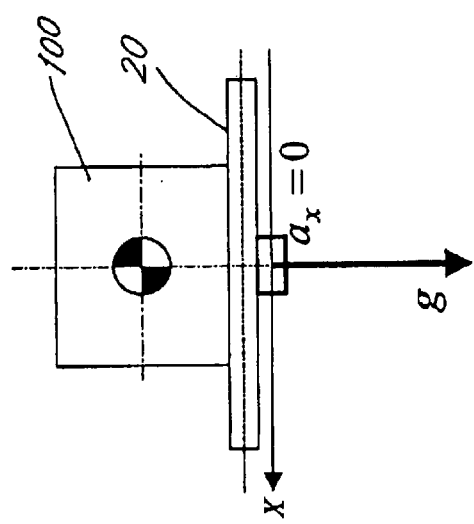

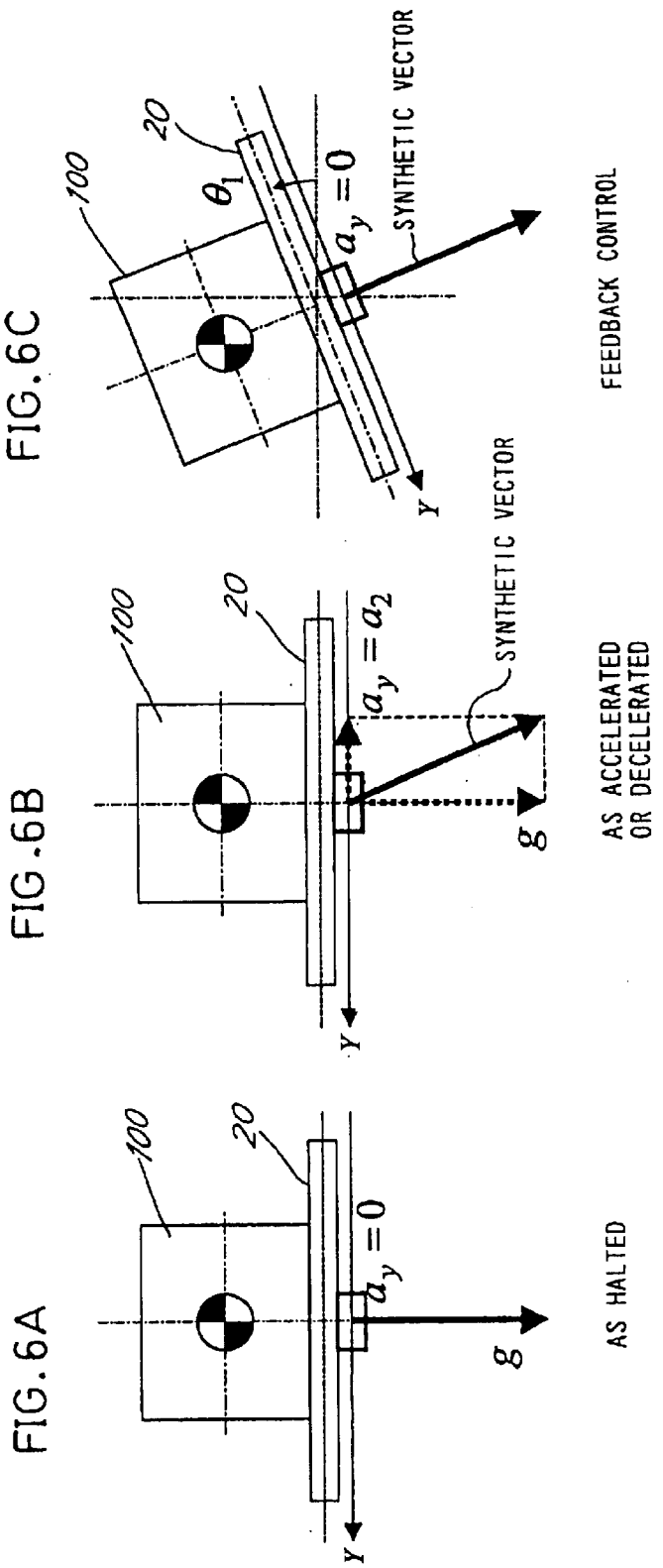

US 6,859,684 B2

METHOD OF CONTROLLING TABLE ANGLE OF TRANSPORT ROBOT

FIELD OF THE INVENTION

The present invention relates to a method of controlling the angle of a table of a self-propelled transport robot for preventing an article placed on the table from falling off or collapsing.

BACKGROUND OF THE INVENTION

FIG. 21 shows a robot 90 already known and comprising a self-propelled carriage 91 adapted to run on the road by rotating wheels 92, and a table 93 provided on the top of the carriage 91 for transporting an article as placed on the table 93.

The table 93 is forwardly or rearwardly and leftwardly or rightwardly tiltably supported by a tilting mechanism on the carriage 91, and is provided with tilt angle sensors (not shown). When the road surface is inclined and even when the carriage 91 has moved up onto an obstacle, the table 93 is tilted so as to be held horizontal and to thereby prevent an article placed on the table 93 from falling off or collapsing.

However, when the transport robot 90 travels, an inertial force due to acceleration or deceleration or a centrifugal force during turning will act on the article. When the table 93 is merely held horizontal, therefore, the article is likely to fall off or collapse, or a liquid will spill if it is being transported on the table.

An object of the present invention is to provide a table angle controlling method capable of effectively preventing an article placed on a table, for example, from falling off by tilting the table so that the synthetic vector of horizontal and gravitational accelerations which act on the table acts on the table perpendicular thereto.

SUMMARY OF THE INVENTION

To overcome the above problem, the present invention provides a method of controlling the angle of a table of a transport robot which method has the steps of measuring the synthetic vector of horizontal and gravitational accelerations which act on the table or a carriage with the movement of the carriage, and tilting the table so that the synthetic vector obtained acts on the table perpendicular thereto.

With the method described, the transport robot measures the synthetic vector acting on the table or the carriage and effects feedback control so that the synthetic vector measured will act on the table perpendicular thereto. Accordingly, only a force acting perpendicular to the table acts on the article placed on the table, with the result that the article on the table is unlikely to fall off or collapse even if the carriage performs a movement involving acceleration or deceleration or turning.

The present invention further provides a method of controlling the angle of a table of a transport robot which method has the steps of estimating acceleration acting on the table from a speed command value input to drive means for a carriage for moving the carriage, calculating the synthetic vector of the estimated horizontal and gravitational accelerations, and tilting the table so that the synthetic vector obtained acts on the table perpendicular thereto.

With the method described, the transport robot first calculates the synthetic vector acting on the table from a speed command value for moving the carriage, and effects feed-forward control so that the calculated synthetic vector will act on the table perpendicular thereto. Accordingly, only a force acting perpendicular to the table acts on the article placed on the table, with the result that the article on the table is unlikely to fall off or collapse even if the carriage performs a movement involving acceleration or deceleration or turning.

Since the transport robot performs feed-forward control, this method has the advantage that the tilt angle of the table is controllable without a delay unlike feedback control.

The invention also provides a transport robot comprising a carriage having running drive means, a table supported on the carriage tiltably, a table tilting mechanism for supporting the table and tilting the table toward a direction of advance of the carriage, a direction orthogonal to the direction of advance and/or a direction comprising the combination of these directions, an acceleration sensor attached to the table for detecting within the plane of the table acceleration in each of the direction of advance of the carriage and a direction orthogonal to the direction of advance, and a controller for calculating the combined acceleration of the acceleration observed by the acceleration sensor and gravitational acceleration, calculating the amount of drive of the table tilting mechanism so that the combined acceleration in the direction of advance of the carriage on the table and acceleration in a direction orthogonal to the direction of advance on the table reduces, and tilting the table.

The transport robot measures the synthetic vector acting on the table, and tilts the table so that the measured synthetic vector will act on the table perpendicular thereto. Accordingly, only a force acting perpendicular to the table acts on the article placed on the table, and the article on the table is unlikely to fall off or collapse even if the carriage performs a movement involving acceleration or deceleration or turning.

BRIEF DESCRIPTION OF THE DRAWINGS

FIGS. 5A to 5C include diagrams for illustrating a tilt of the table in the direction of X-axis in feedback control;

FIGS. 6A to 6C include diagrams for illustrating a tilt of the table in the direction of Y-axis in feedback control;

DESCRIPTION OF THE PREFERRED EMBODIMENT

Figure 1:
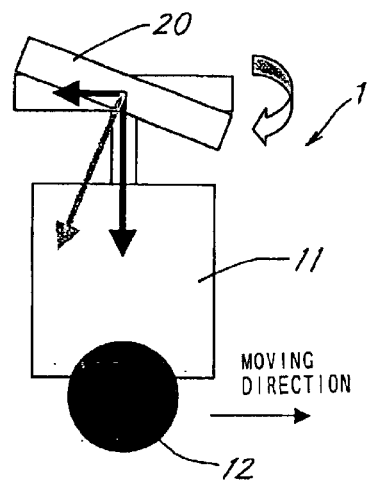
FIG. 1 is a diagram for illustrating the controlled state of a transport robot.

FIG. 1 shows an embodiment of article transport robot 1 for practicing the table angle control method of the present invention. The illustrated transport robot 1 comprises a carriage 11 having a left and a right running wheel 12, and a table 20 mounted on the top of the carriage 11 and tiltable forward or rearward and leftward or rightward by a tilting mechanism. The running wheels 12 are coupled to a motor or like drive means. The robot is movable forward or rearward by the rotation of the two wheels 12. The robot is turned leftward or rightward by changing the amount or direction of rotation of the wheels 12.

Figure 2:
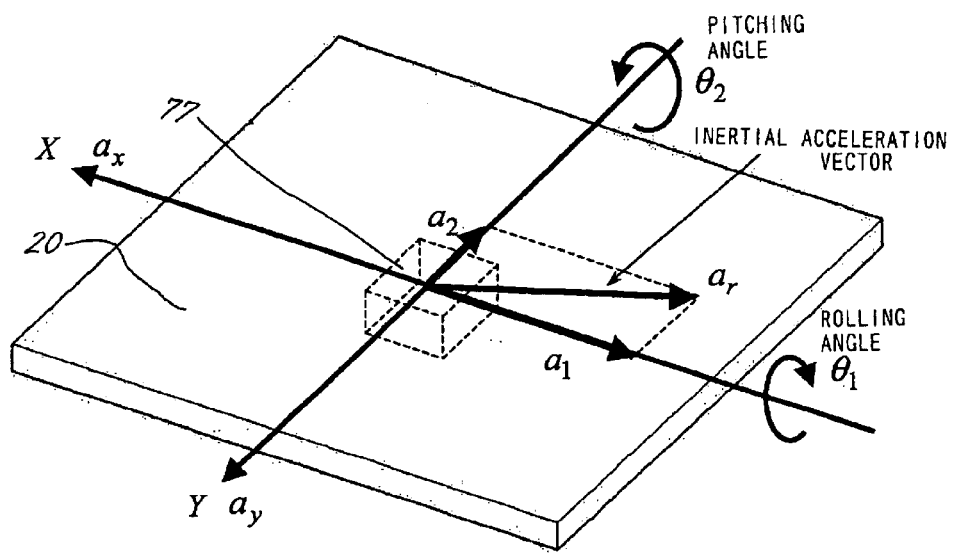
FIG. 2 is a perspective view showing axes of a table and the directions of angles.

The table 20 is supported by the tilting mechanism on the carriage 11 so as to be tiltable forward or rearward, leftward or rightward and combined directions relative to the carriage 11, about phantom X-axis (a line of intersection of a plane containing the direction of advance of the carriage 11 with the table 20) and phantom Y-axis (a line of intersection of a plane perpendicular to the direction of advance of the carriage 11 with the table 20) which intersect each other within the plane of the table 20 as shown in FIG. 2. The table 20 can be tilted within a predetermined range of angles by combinations of tilts in such directions. The mechanism for tilting the table 20 is not limited particularly but can be a known mechanism. Especially preferable is the mechanism to be described with reference to the embodiment given later.

Figure 3C:
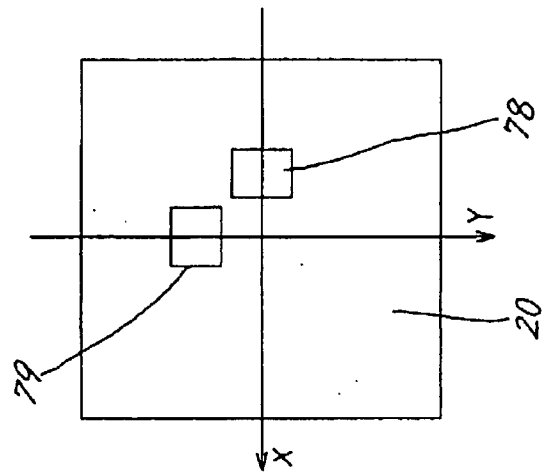
FIGS. 3A to 3C include diagrams showing arrangements of sensors on the table.
Figure 3B:
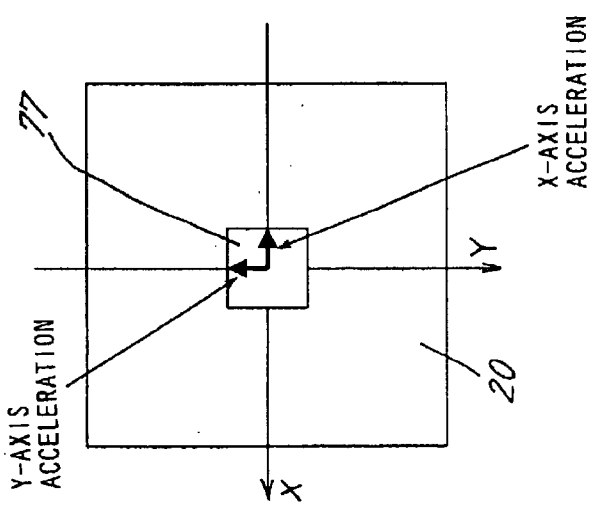
Figure 3A:
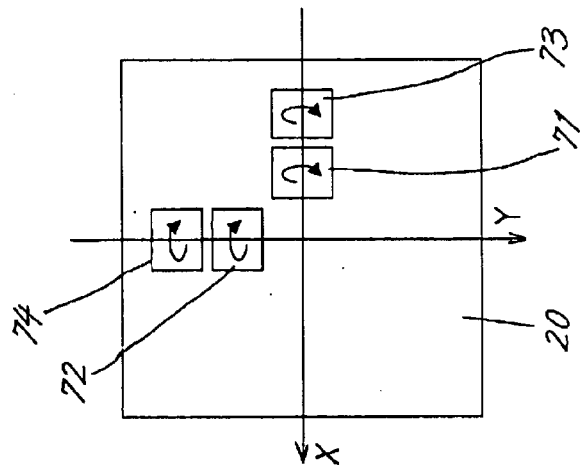

The tilt angle of the table 20 and the acceleration acting on the table 20 can be detected by various acceleration sensors. For example, tilt angle sensors 71, 72 for measuring tilt angles and gyros 73, 74 for measuring angular velocities are arranged along X-axis and Y-axis as shown in FIG. 3A. Alternatively, a two-axis acceleration sensor 77 can be disposed on the table 20 for detecting acceleration in the direction of X-axis and acceleration in the direction of Y-axis within the plane of the table 20 as seen in FIG. 3B. When the table 20 is inclined, the table tilts in X-axis direction and/or Y-axis direction, so that variations in gravitational acceleration in X-axis direction and/or Y-axis direction can also be measured by using the two-axis acceleration sensor 77. Further as shown in FIG. 3C and described below, acceleration sensors 78, 79 are arranged respectively on X-axis and Y-axis, whereby acceleration can be measured for each of the axes.

The table angle control method of the present invention controls the angle of the table 20 so that the synthetic vector of horizontal and gravitational accelerations which act on the table 20 will act on the table 20 perpendicular thereto. The mode of control can be divided into two types, i.e., "feedback control" and "feed-forward control."

[Feedback Control]

Figure 4:
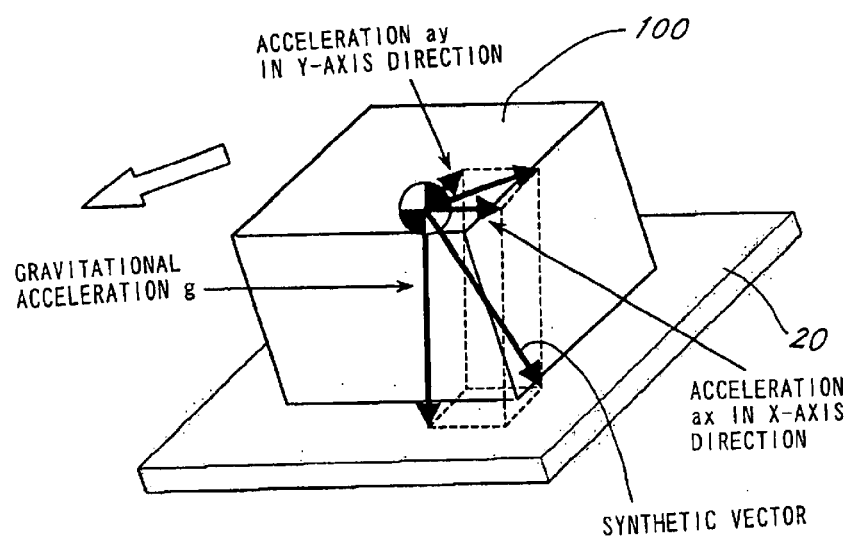
FIG. 4 is a diagram for illustrating the synthetic vector of horizontal and gravitational accelerations acting on an article placed on the table.
Figure 7:
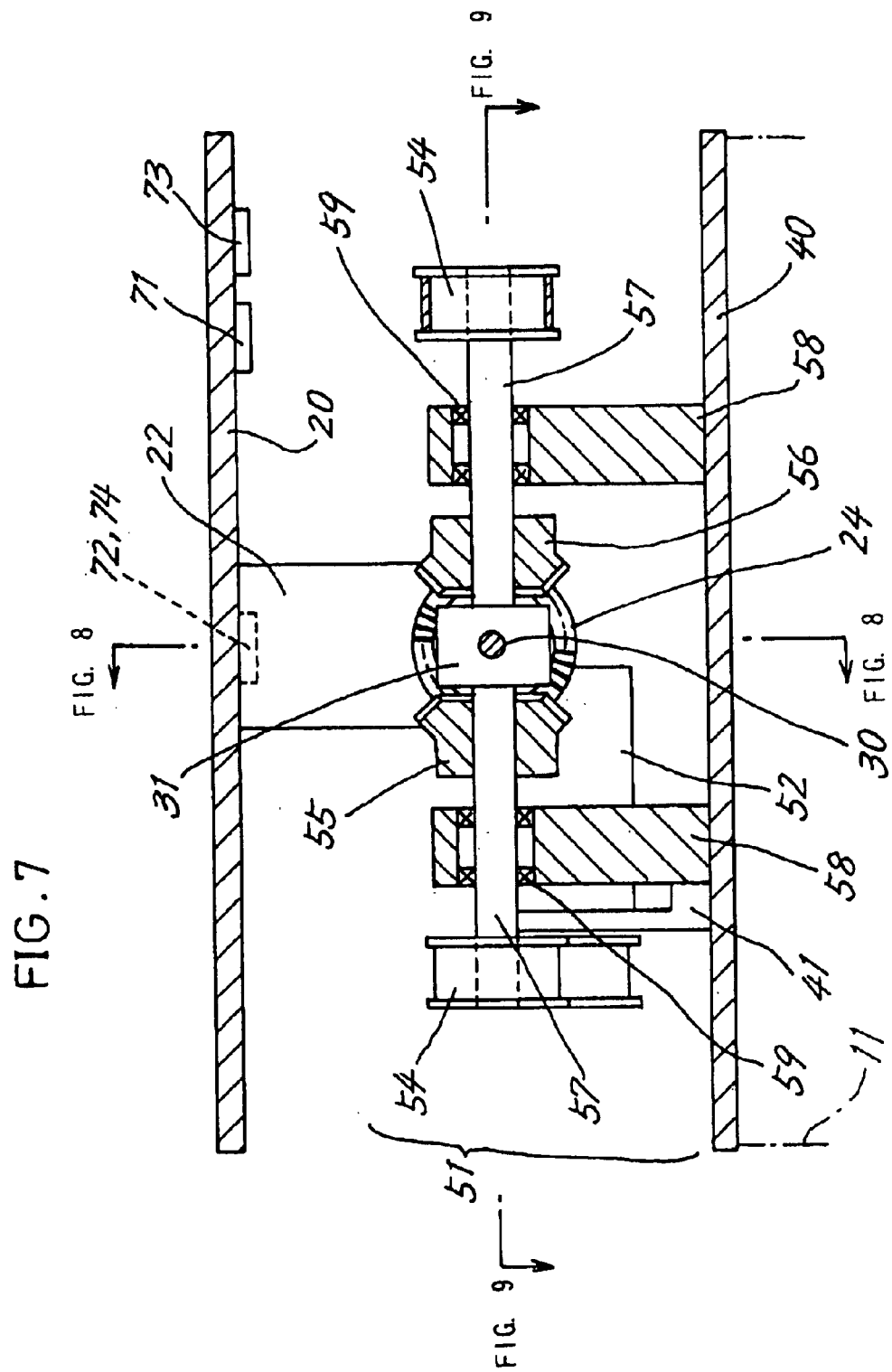
FIG. 7 is a view in vertical section of a table tilting mechanism.
Figure 8:
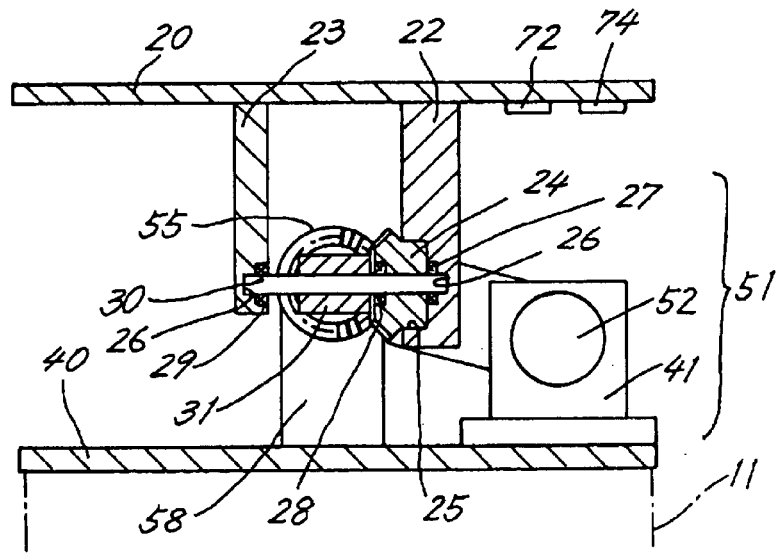
FIG. 8 is a view in section taken along the line 8—8 in FIG. 7.

In this mode of control, the synthetic vector of an inertial force and a gravitational acceleration acting on the table 20 or carriage 11 is observed, and the table 20 is tilted so that the synthetic vector will act on the table 20 perpendicular thereto as shown in FIG. 4.

Control the table in the directions of X-axis and Y-axis will be described below.

Control in the direction of X-axis is effected based on the observed value of acceleration ax in the direction of X-axis by the acceleration sensor 78 (see FIG. 3).

FIG. 5A shows the carriage 11 as halted or in travel at a constant speed. Gravitational acceleration g only acts on the table 20 in this state. The value of acceleration in the direction of X-axis measured by the sensor 78 attached to the table 20 is zero, so that positioning the table 20 with its X-axis held horizontal permits no force along the direction of X-axis to act between the table 20 and an article 100 placed thereon, obviating the likelihood that the article 100 will, for example, collapse.

FIG. 5B shows the carriage 11 as accelerated or decelerated in the direction of advance. Acting on the table 20 in this state is acceleration ax (=a1) due to an inertial force in the direction of X-axis in addition to gravitational acceleration g, and the acceleration sensor 78 detects acceleration a1 along the direction of X-axis. Thus, the article 100 is subjected to a force acting in the direction of the combined force of gravitational acceleration g and acceleration a1. At this time, when the table 20 is tilted in a direction perpendicular to the resultant by inertial force following control as shown in FIG. 5C, the acceleration ax toward the direction of X-axis becomes zero. Since the synthetic vector in the direction of X-axis acting on the article 100 is perpendicular to the table 20, no force acts on the article 100 in parallel to the table 20, obviating, for example, collapsing of the article 100.

For control in the direction of Y-axis, the same mode of control as in the direction of X-axis is effected based on the output of the acceleration sensor 79 for the Y-axis direction as shown in FIGS. 6A to 6C. Incidentally, acceleration ay acts in the direction of Y-axis when the carriage 11 travels along the direction of Y-axis, when the carriage 11 turns, or when the carriage runs along a slope.

The article 100 placed on the table 20 can be prevented, for example, from falling off or collapsing by observing acceleration acting on the table 20 in the directions of both X-axis and Y-axis as described above, and tilting the table 20 so that the synthetic vector of the horizontal acceleration and gravitational acceleration will be zero.

[Feed-Forward Control]

This method of control comprises observing the angular velocity of rotation or the number of revolutions of the motor transmitted to the running drive means of the carriage 11 for traveling the carriage 11, calculating values of acceleration in the directions of X-axis and Y-axis acting in the plane of the table 20 mounted on the carriage 11 from the observed value, and controlling the tilt of the table 20 so as to cause the synthetic vector of these acceleration values and gravity to act on the table 20 perpendicular thereto. In the method of feedback control described, the tilt angle of the table 20 corresponding to the acceleration acting on the table 20 is calculated after the action of the acceleration, so that a delayed response will result, whereas in the feed-forward control, a tilt angle corresponding to acceleration can be calculated in advance, hence occurrence of no delay.

[Table Tilting Mechanism]

A specific example of table tilting mechanism will be described next.

With reference to FIGS. 7 to 10, provided on a base 40 on the top of carriage 11 are the table 20 for placing an article thereon, and a table drive means 51 for supporting and tilting the table 20.

Figure 9:
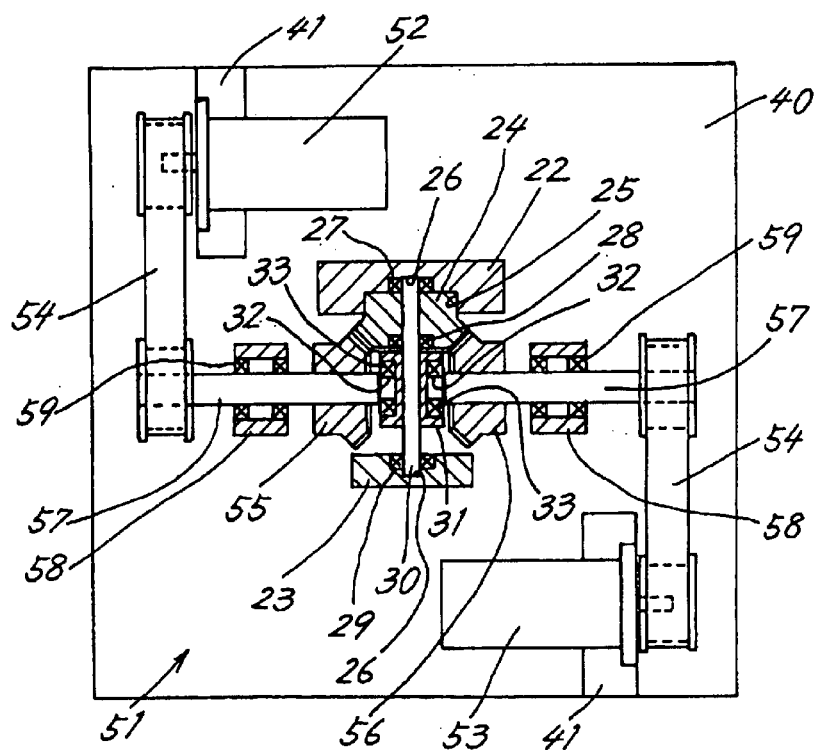
FIG. 9 is a view in section taken along the line 9—9 in FIG. 7.

As shown in FIG. 9, the table drive means 51 comprises two drive motors 52, 53, reduction gear mechanisms 54, 54 (comprising a belt and pulleys in the illustrated embodiment) coupled to the respective drive motors 52, 53, and a differential gear (comprising bevel gears 55, 56, 24) coupled to the reduction gear mechanisms 54, 54. The drive motors 52, 53 are fixed to the base 40 by respective brackets 41, 41. As illustrated, rotating shafts 57, 57 are arranged in alignment, with the drive bevel gears 55, 56 mounted thereon as opposed to each other. The rotating shafts 57, 57 are supported respectively by bearings 59, 59 on respective support brackets 58, 58 provided on the base 40.

Figure 10:
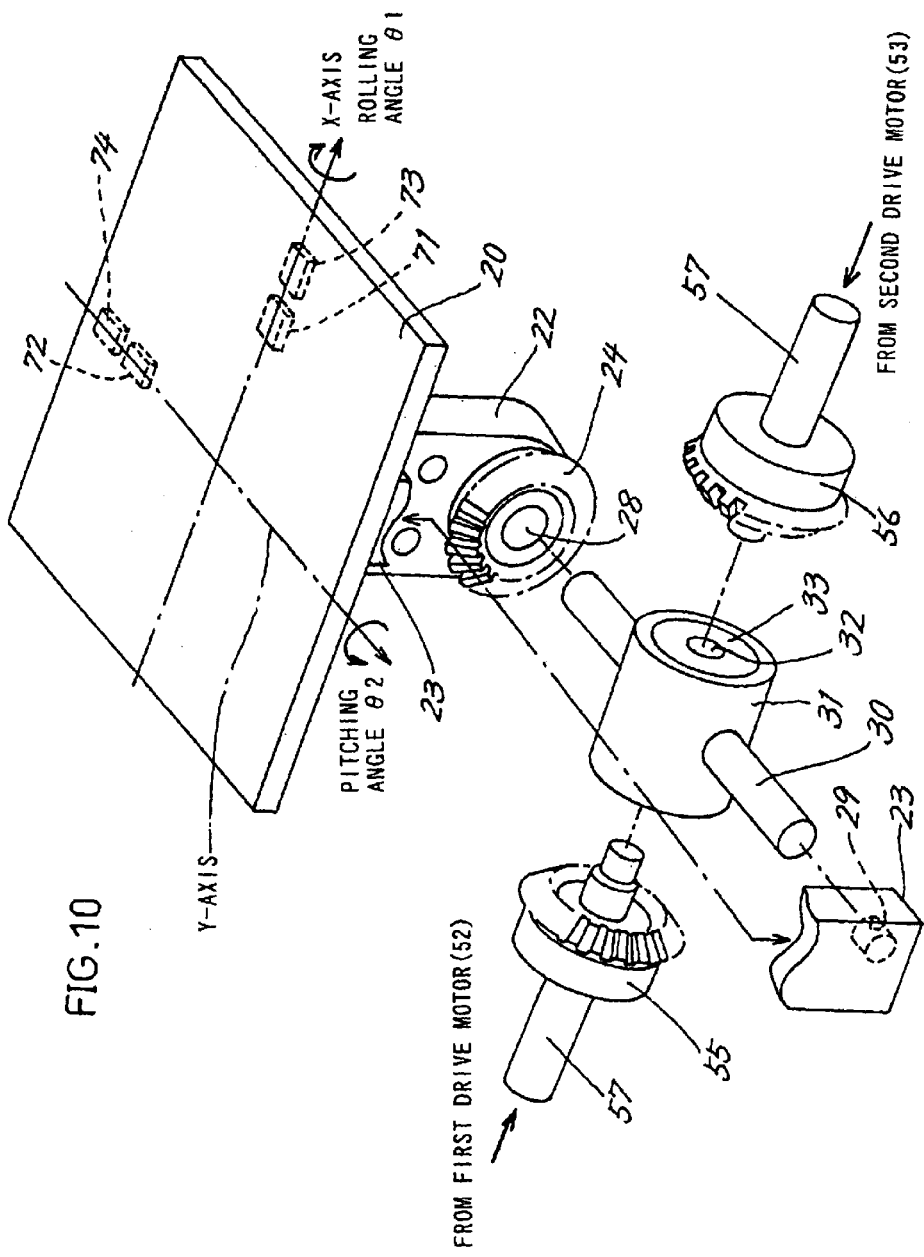
FIG. 10 is an enlarged exploded fragmentary perspective view of the table tilting mechanism.

The rotating shafts 57, 57 for the drive bevel gears 55, 56 have opposed ends extending through the respective gears 55, 56 as shown in FIGS. 9 and 10, reduced in diameter and fitting in respective bearings 33, 33 on a support sleeve 31 to be described later.

The table 20 has a post 22 and an auxiliary post 23 extending downward from the lower surface of the table 20. The post 22 has in its lower end a gear cavity 25 for fixedly fitting the bevel gear 24 therein. A shaft bore 26 for supporting the support shaft 30 to be described below is further formed in the gear cavity 25 centrally thereof. A bearing 27 is provided in the shaft bore 26.

The bevel gear 24 is non rotatably fixed in the gear cavity 25 in the post 22. The support shaft 30 extending through the bevel gear 24 centrally thereof is supported by a bearing 28 on the bevel gear 24. The bevel gear 24 is in mesh with both the drive bevel gears 55, 56 coupled to the respective drive motors 52, 53.

The support shaft 30 supported at one end thereof by the bore 26 of the post 22 and the bevel gear 24 intersects the axis of the rotating shafts 57, 57 of the drive bevel gears 55, 56 at right angles therewith, extends approximately at the midportion thereof through the side wall of the support sleeve 31, and is supported at the other end thereof by a bearing 29 in a shaft bore 26 formed in the auxiliary post 23 as shown in FIG. 10. The support sleeve 31 is provided at opposite ends thereof with respective bearings 33, 33, with the opposed ends of the rotating shafts 57, 57 of the drive gears 55, 56 supported by, and inserted in the bores 32, 32 of, the bearings 33, 33, respectively as shown in FIGS. 9 and 10.

The opposite ends of the support shaft 30 are held between and supported by the post 22 and the auxiliary post 23, and the support sleeve 31 fixed to the support shaft 30 is free to rotate as supported by the drive bevel gears 55, 56. Accordingly, the distance between the bevel gear 24 and the rotating shafts 57, 57 of the drive bevel gears 55, 56 is unaltered, and the bevel gear 24 is held in mesh with the drive bevel gears 55, 56.

When the drive motors 52, 53 are driven, the drive bevel gears 55, 56 are rotatingly shifted through a predetermined angle, moving the bevel gear 24 on the drive bevel gears 55, 56 relative thereto to tilt the table 20 and tilting the table 20.

[Control of Tilt of Table]

Next, a description will be given of control of the tilt of the table 20. With reference to FIG. 10, suppose the angle of rotation about X-axis parallel to the rotating shafts 57, 57 of the drive bevel gears 55, 56 is a rolling angle θ1, and the angle of rotation about Y-axis orthogonal to X-axis is a pitching angle θ2. Further with reference to FIG. 9, the drive motor 52 at the left-hand side of the drawing is to be referred to as the "first drive motor," the drive bevel gear 55 receiving the power of the first drive motor 52 as the "first drive bevel gear," the drive motor 53 at the right-hand side of the drawing as the "second drive motor," and the drive bevel gear 56 receiving the power of the second drive motor 53 as the "second drive bevel gear."

The relationship between the rotation of the first drive motor 52 and the second drive motor 53 and the direction of tilting of the table 20 will be described.

Figure 11:
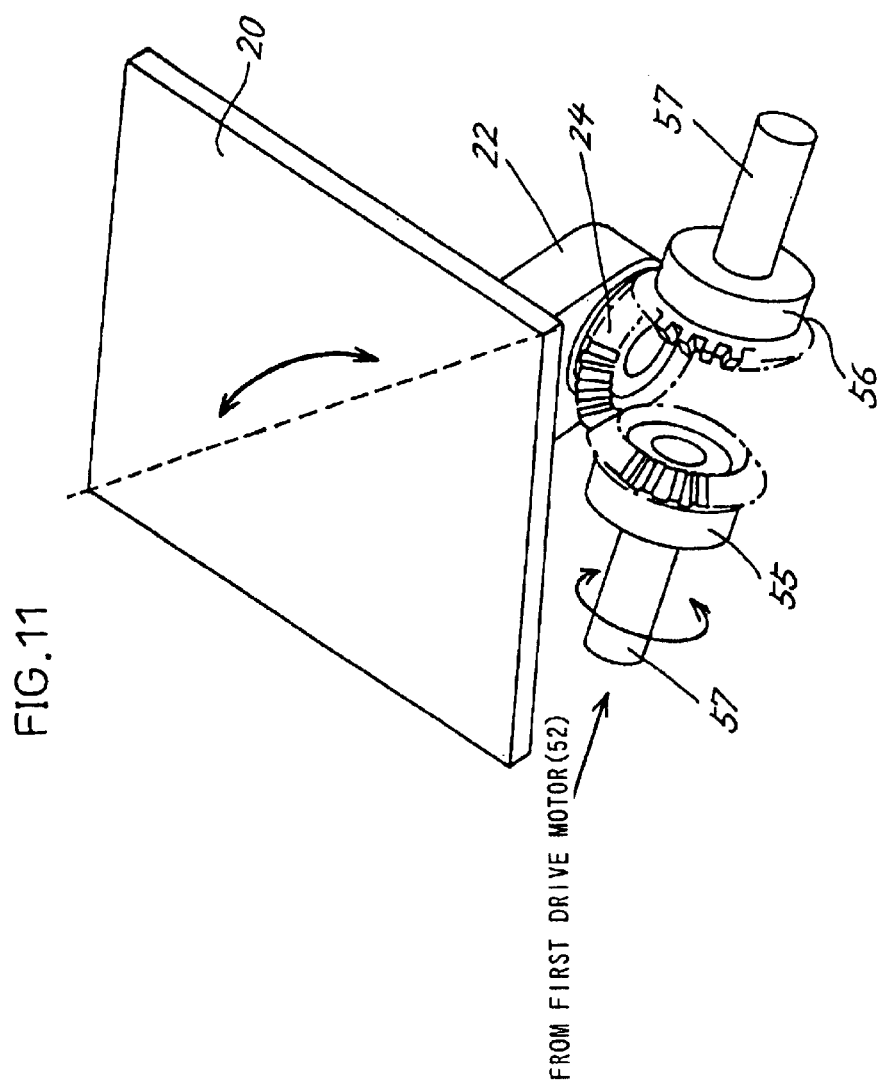
FIG. 11 is a perspective view showing the table as tilted when a first drive motor only is driven.

When the first drive motor 52 only is rotated with the table 20 positioned in parallel to the base 40 while holding the second drive motor 53 at rest, the first drive bevel gear 55 only rotates as shown in FIG. 11. Due to the rotation of the gear 55, the bevel gear 24 is subjected to torque about the support shaft 30. However, since the second drive bevel gear 56 is at rest, the bevel gear 24 revolves about the rotating shaft 57, tilting the table 20 about a broken line at an angle of 45° with X-axis and Y-axis as shown in FIG. 11.

Figure 12:
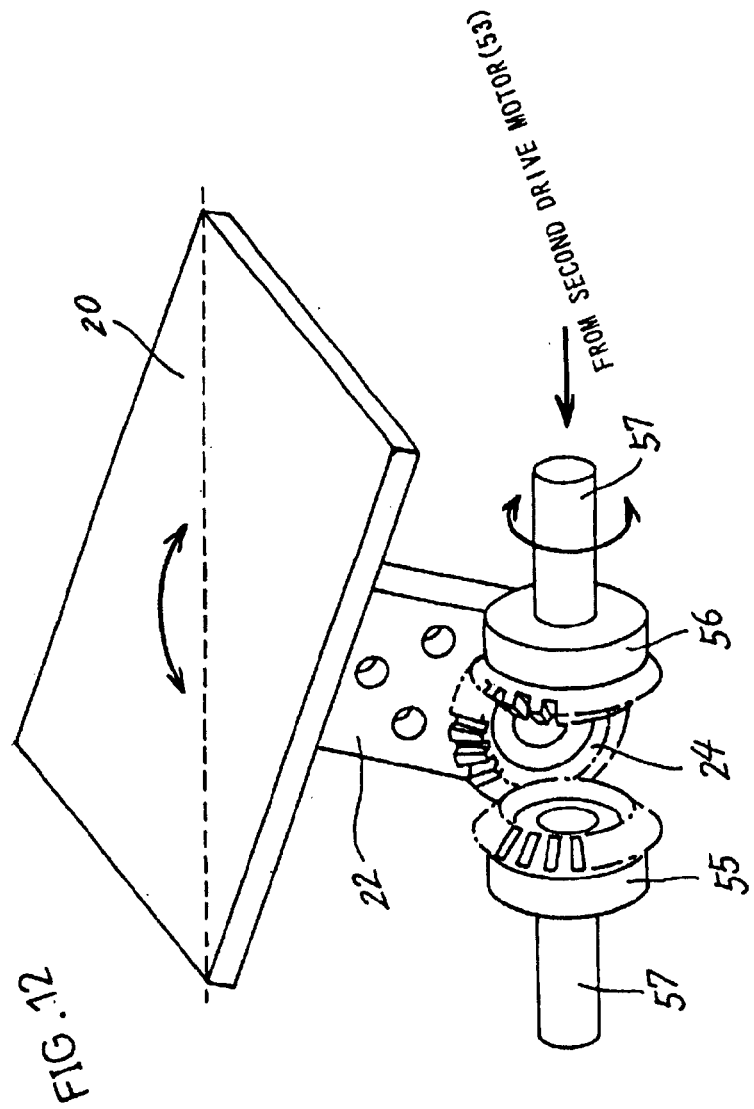
FIG. 12 is a perspective view showing the table as tilted when a second drive motor only is driven.

Similarly when the second drive motor 53 only is rotated with the first drive motor 52 at rest, the table 20 tilts in the direction of arrow in FIG. 12.

Figure 13:
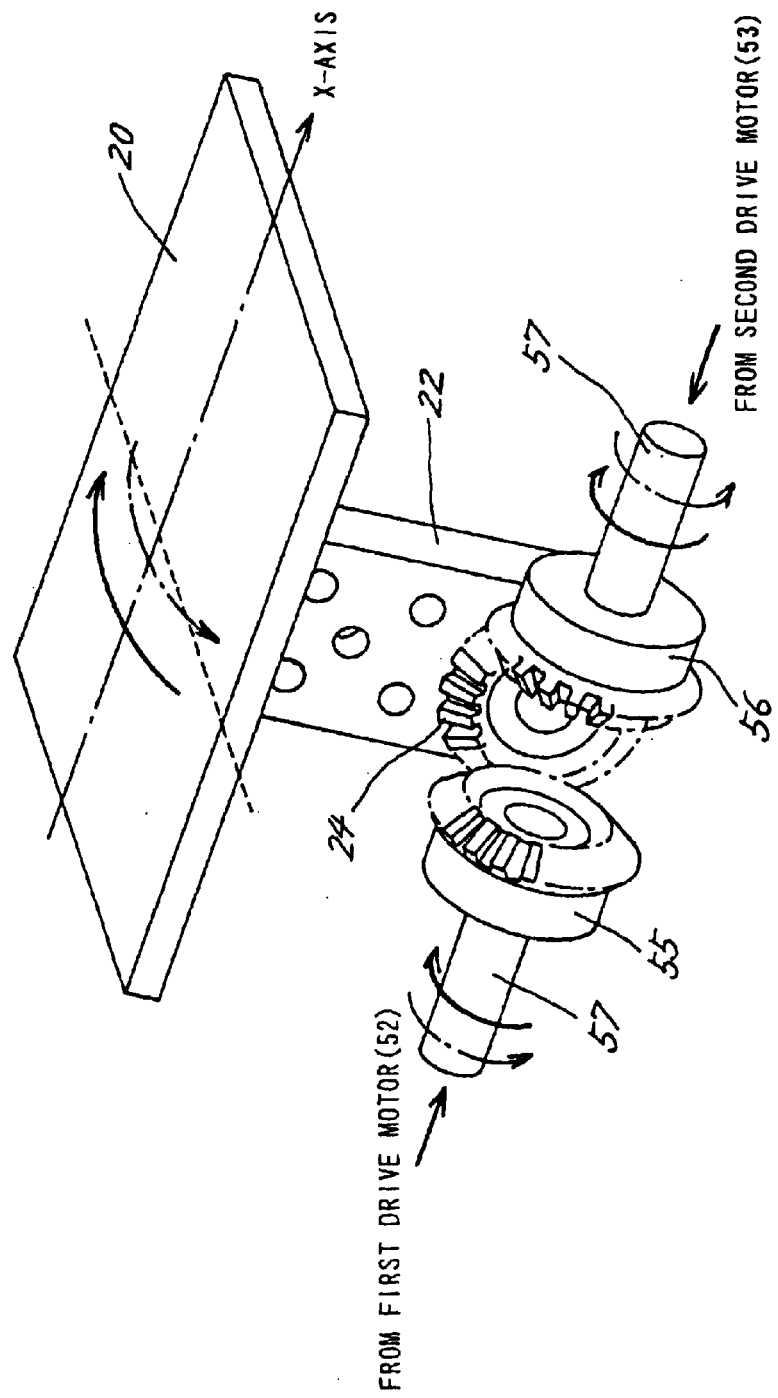
FIG. 13 is a perspective view showing the table as tilted about X-axis when the two drive motors are driven in the same direction.

Further when both the first and second drive motors 52, 53 are driven at the same time to rotate the first and second drive bevel gears 55, 56 in the same direction, the table 20 tilts in a plane perpendicular to X-axis as shown in FIG. 13. Stated more specifically, when the drive bevel gears 55, 56 are rotated toward the direction of the solid-line arrows, the table 20 tilts toward the direction of the solid-line arrow, while when the drive bevel gears 55, 56 are rotated toward the direction of the chain-line arrows, the table 20 tilts toward the direction of the chain-line arrow.

Figure 14:
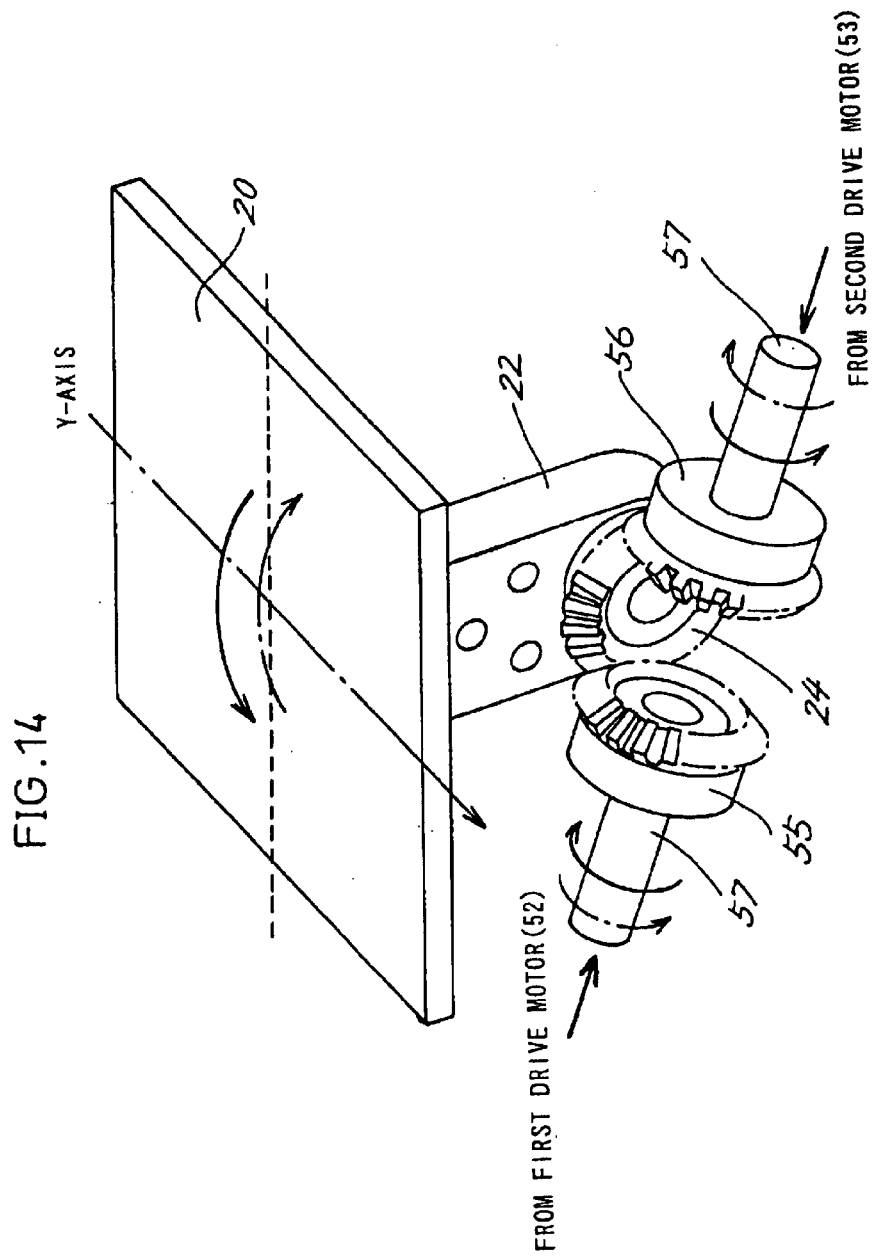
FIG. 14 is a perspective view showing the table as tilted about Y-axis when the two drive motors are driven in opposite directions.

When the first drive bevel gear 55 and the second drive bevel gear 56 are rotated in opposite directions to each other at the same time as shown in FIG. 14, the table 20 tilts in a plane perpendicular to Y-axis. Stated more specifically, when the drive bevel gears 55, 56 are rotated toward the directions of the solid-line arrows, the table 20 tilts toward the direction of the solid-line arrow, while when the drive bevel gears 55, 56 are rotated toward the directions of the chain-line arrows, the table 20 tilts toward the direction of the chain-line arrow.

Figure 15:
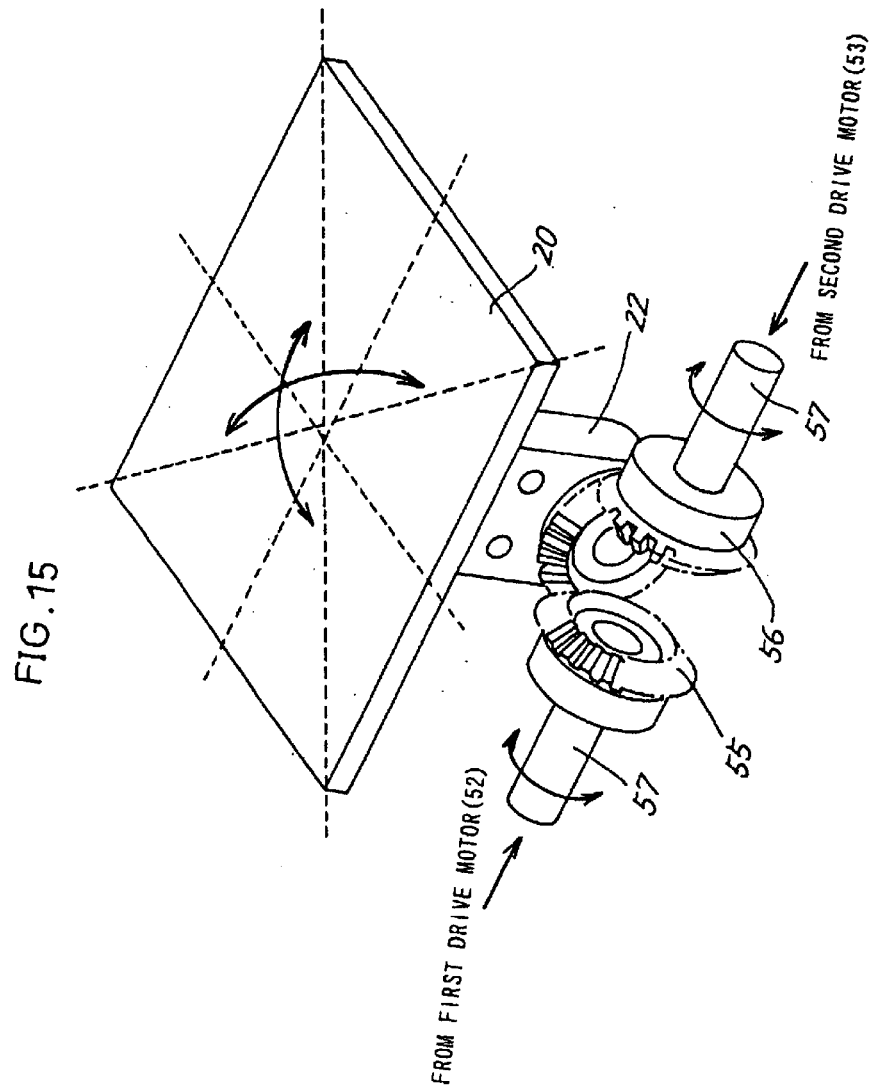
FIG. 15 is a perspective view showing the entire tilting range of the table.

The table 20 can be tilted at a desired angle as shown in FIG. 15 by combining such movements.

The angle controlling method of the invention can be practiced in the manner to be described below using the table tilting mechanism.

[Feedback Control]

For use in controlling, acceleration sensors 78, 79 are provided on the rear surface of the table 20 for X-axis and Y-axis for measuring acceleration in the respective directions of X-axis and Y-axis as shown in FIG. 3C.

Figure 16:
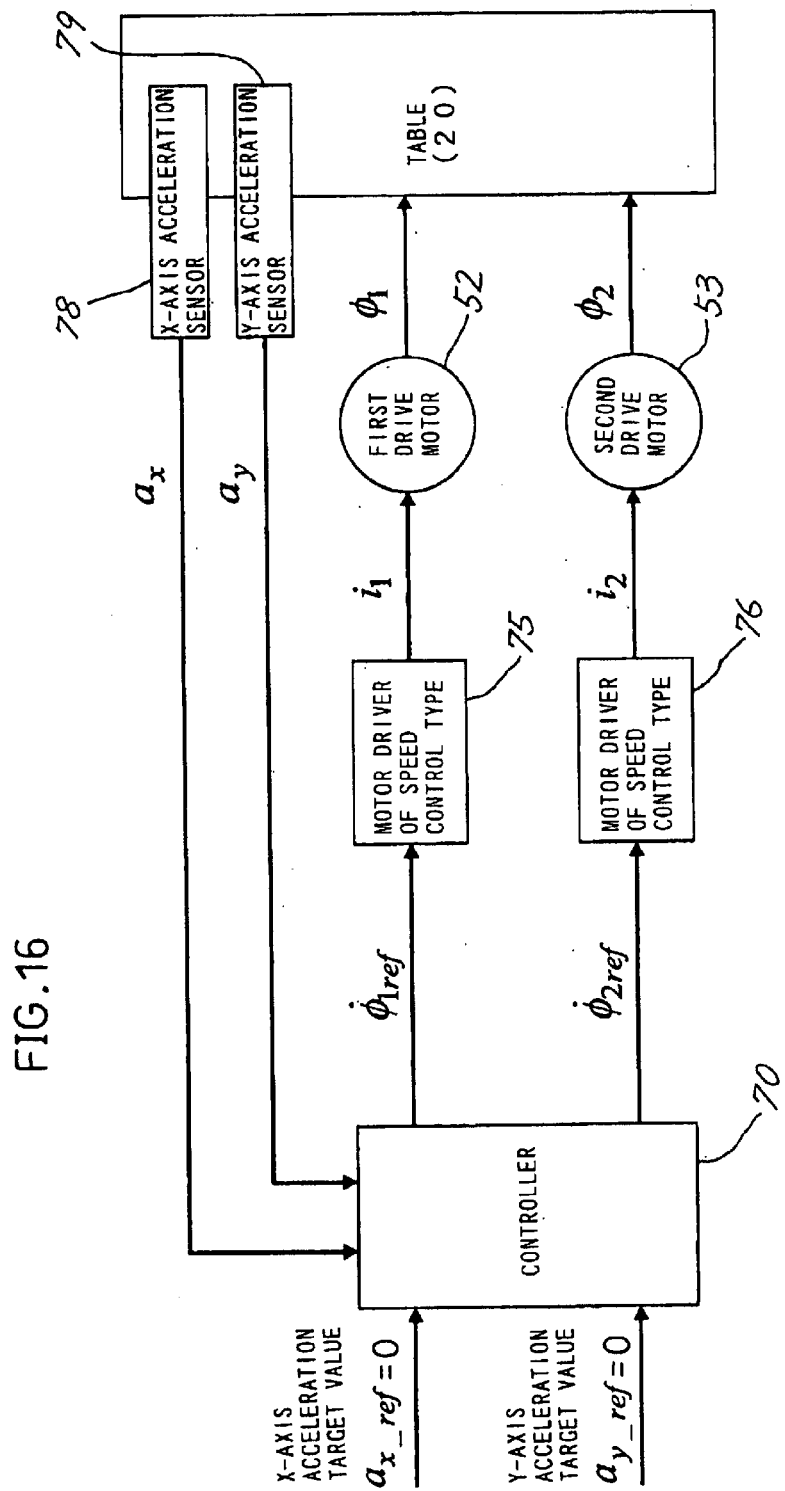
FIG. 16 is a block diagram showing the construction of a feedback control system and the flow of control signals.
Figure 17:
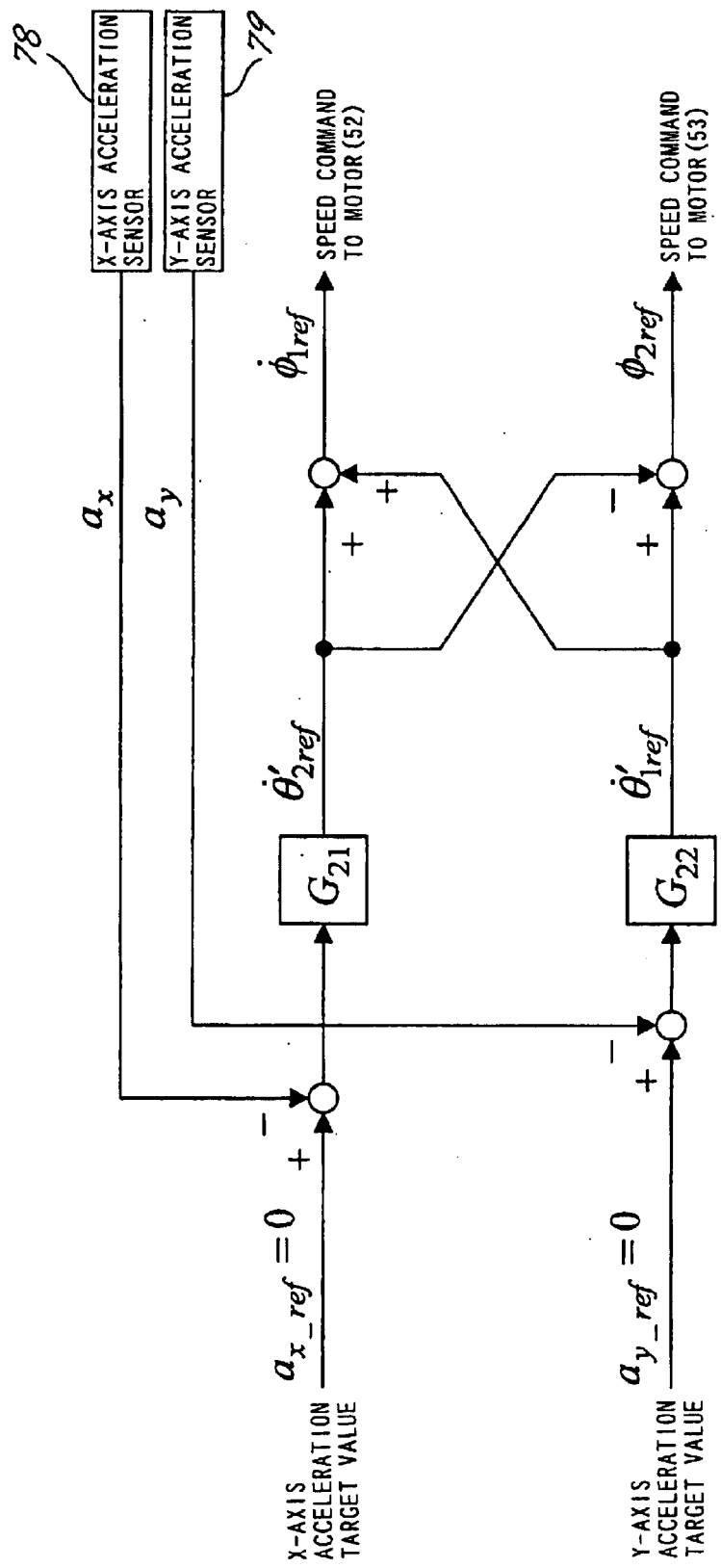
FIG. 17 is a detailed control block diagram of a controller of the feedback control system.
Figure 18:
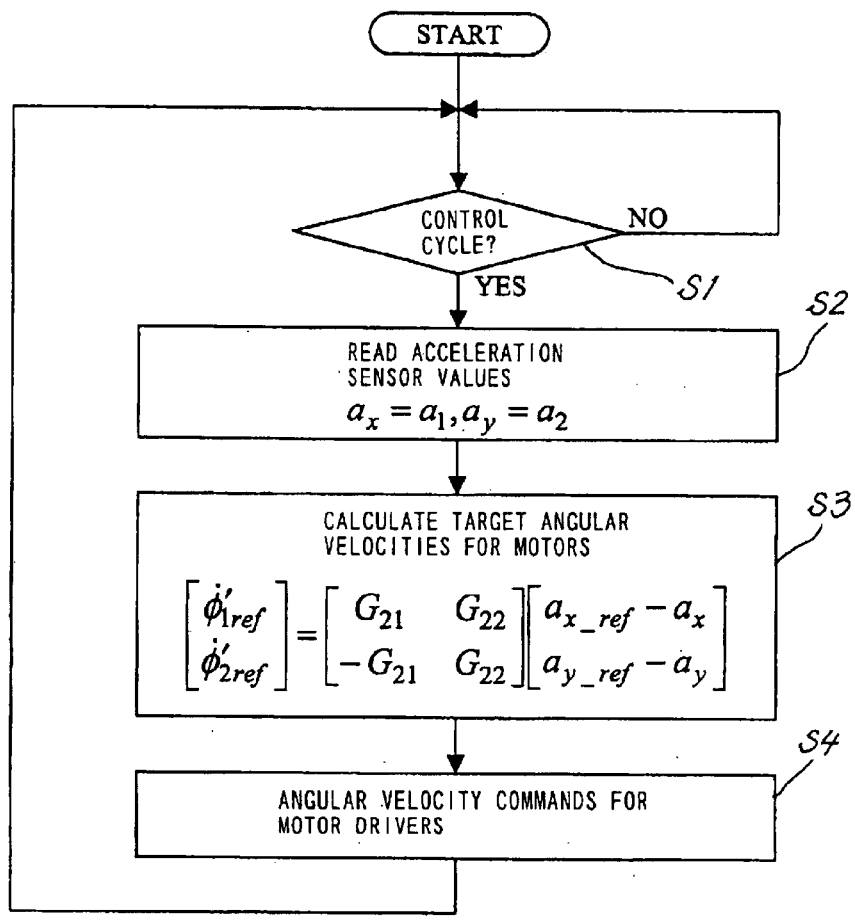
FIG. 18 shows the control flow of feedback control.

FIG. 16 is a block diagram showing the construction of a feedback control system and the flow of control signals. FIG. 17 is a block diagram of a controller 70 of the feedback control system. FIG. 18 shows the control flow of the controller 70.

The acceleration to be observed by the acceleration sensors 78, 79 with the movement of the carriage 11 is input to the controller 70, the synthetic vector of the horizontal acceleration and gravitational acceleration acts on the table 20, and driving the table tilting mechanism by the controller 70 tilts the table 20 so that the synthetic vector will act on the table perpendicular to the surface thereof. Stated more specifically, the rotation of the drive motors 52, 53 is controlled so that the acceleration ax in the direction of X-axis and the acceleration ay in the direction of Y-axis in FIGS. 4 to 6 described will become zero. Although not shown, the angle of rotation, angular velocity and current of the drive motors 52, 53 are measured by sensors, and the measurements are fed back to motor drivers 75, 76 to thereby effect speed control.

The controller 70 reads the measurements of the acceleration sensors 78, 79 in a predetermined cycle (FIG. 18, step S1 and step S2).

Based on the measurements obtained by the sensors 78, 79, the controller 70 calculates the differences between the measurements and respective target values of acceleration ax in the direction of X-axis and acceleration ay in the direction of Y-axis so that the target values become zero.

With respect to the direction of the rolling angle, the respective differences obtained are multiplied by gains G21 and G22 to determine angular velocity references in the direction in which the difference decreases (step S3). The table 20 is tilted toward the direction of rolling angle by rotating the two drive motors 52, 53 in the same direction (see FIG. 13), so that the references obtained are positively input to the respective motor drivers 75, 76 (step S4).

Similarly with respect to the direction of pitching angle, the difference between a target value of the pitching angle and the current pitching angle of the table 20 obtained by the pitching angle sensor 72 is multiplied by gains G21 and G22 to determine the angular velocity reference toward the direction in which the difference decreases (step S3). Since the table 20 is tilted toward the direction of pitching angle by rotating the two drive motors 52, 53 in opposite directions at the same time (see FIG. 14), the reference is positively input to the motor driver 75 and the reference is negatively input to the motor driver 76 as shown in FIG. 17.

The speed commands to be given to the respective drive motors 52, 53 are determined (step S4), and predetermined current values are given to the drive motors 52, 53 via the motor drivers 75, 76, whereby the table 20 is tilted so that the synthetic vector of horizontal and gravitational accelerations which act on the table 20 will act on the table 20 perpendicular thereto.

[Feed-Forward Control]

Figure 19:
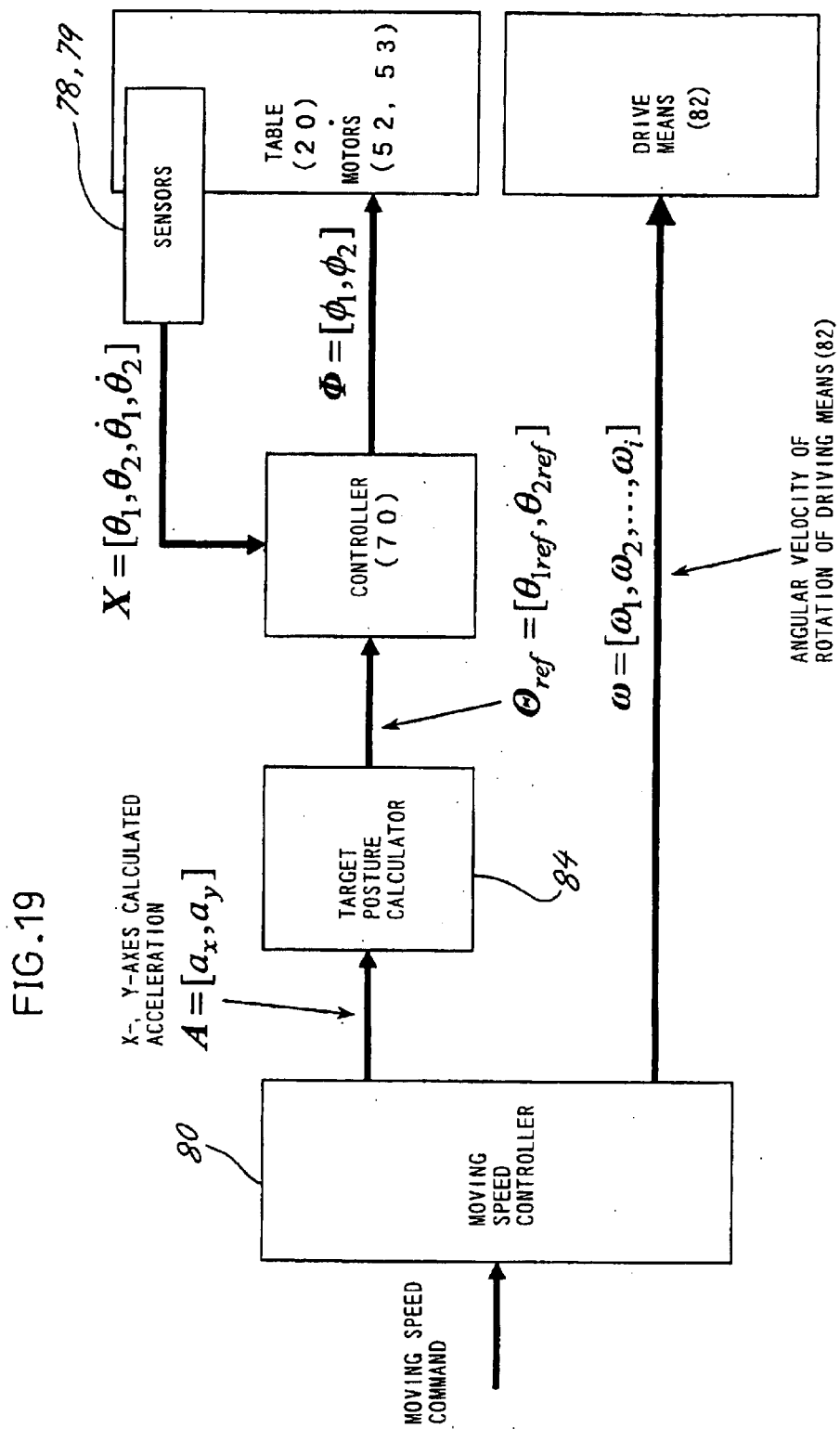
FIG. 19 is a block diagram showing the construction of a feed-forward control system and the flow of control signals.
Figure 20:
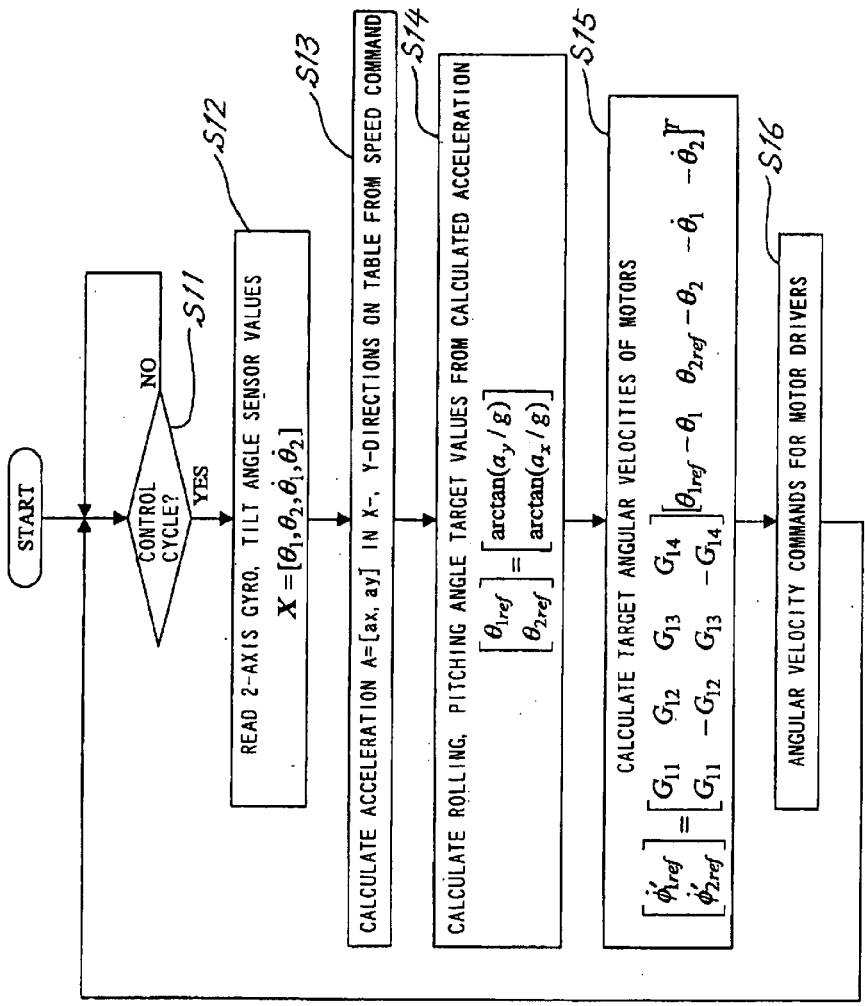
FIG. 20 shows the control flow of feed-forward control.
Figure 21:
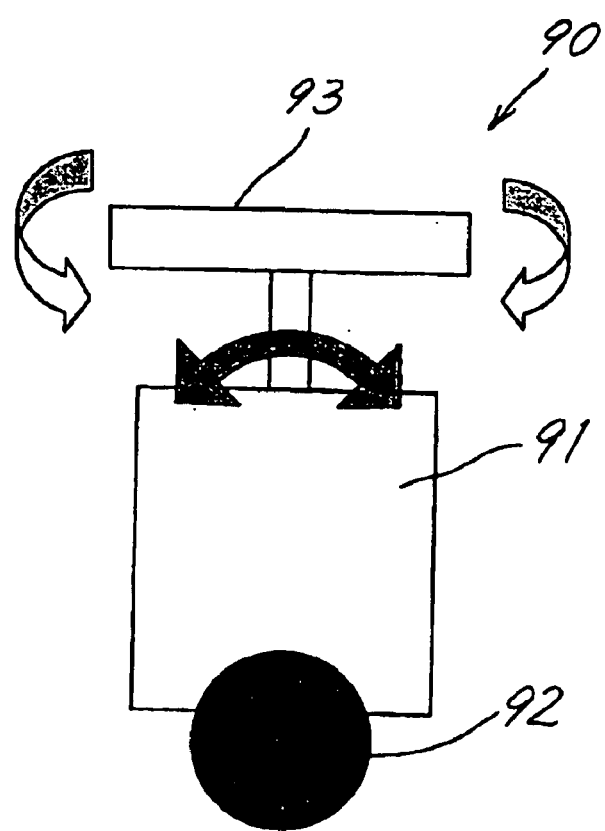
FIG. 21 is a diagram for illustrating the controlled state of a conventional transport robot.

A description will be given with reference to FIG. 19 which is a block diagram of a control system and FIG. 20 which shows a control flow. The same procedure as included in feedback control will not be described repeatedly.

The wheels 12 of the carriage 11 are coupled to the motors or like drive means 82. Driving the drive means 82 rotates the wheels 12 and causes the carriage 11 to run. As shown in FIG. 19, the drive means 82 is controlled for driving by a moving speed controller 80, to which a moving speed command is given from outside to determine the angular velocity of rotation of the drive means 82.

According to the present embodiment, the current tilt angle of the table 20 and/or current angular velocity are/is read every predetermined cycle (step S11) in step S12, and acceleration acting in the directions of X- and Y-axes are determined from the moving speed command given to the moving speed controller 80 (step S13).

The acceleration information relating to the carriage 11 and given by the controller 80 with respect to the direction of advance on the ground and leftward or rightward direction is fed to a target posture calculator 84, which in turn calculates a target tilt angle of the table 20 permitting the synthetic vector of the acceleration in each of the direction and gravity to act on the table 20 perpendicular thereto (step S14). Through the same procedure as shown in FIG. 17 described, an angular velocity reference is calculated (step S15) from the angle information obtained by steps S12 and S14, angular velocity commands are given to the motor drivers 75, 76 (step S16) to tilt the table 20.

The angle of the table can be controlled without a delay by the feed-forward control procedure described above.

Apparently, the present invention can be altered and modified by one skilled in the art without departing from the spirit of the invention, and such modifications are included within the scope of the invention as set forth in the appended claims.

What is claimed is:

1. A method for controlling a table angle of a transport robot comprising a self-propelled carriage and a table provided on the carriage and tiltable forward or rearward, leftward or rightward for placing an article thereon, the table angle controlling method being characterized in that the table is tilted so that the synthetic vector of horizontal and gravitational accelerations acting on the table or the carriage with the movement of the carriage acts on the table perpendicular thereto; and using a controller for calculating a combined acceleration of the acceleration observed by an acceleration sensor and gravitational acceleration, calculating the amount of drive of the table tilting mechanism so that the combined acceleration in the direction of advance of the carriage on the table and acceleration in a direction orthogonal to a direction of advance on the table reduces, and tilting the table.

2. The method according to claim 1 which is characterized in that the method has the steps of:

measuring the acceleration acting on the table or the carriage with the movement of the carriage, and tilting the table so that the synthetic vector of the horizontal acceleration measured and gravitational acceleration acts on the table perpendicular thereto.

3. A method for controlling a table angle of a transport robot comprising a self-propelled carriage and a table provided on the carriage and tiltable forward or rearward and/or leftward or rightward for placing an article thereon, the table angle controlling method being characterized in that the method has the steps of:

estimating acceleration acting on the table from a speed command value input to drive means for the carriage for moving the carriage, calculating the synthetic vector of the estimated horizontal acceleration and gravitational acceleration, and tilting the table so that the synthetic vector obtained acts on the table perpendicular thereto.

4. A transport robot comprising:

a carriage having running drive means, a table supported on the carriage tiltably, a table tilting mechanism for supporting the table and tilting the table toward the direction of advance of the carriage, a direction orthogonal to the direction of advance and/or a direction comprising the combination of these directions, an acceleration sensor attached to the table for detecting within the plane of the table acceleration in each of the direction of advance of the carriage and a direction orthogonal to the direction of advance, and a controller for calculating the combined acceleration of the acceleration observed by the acceleration sensor and gravitational acceleration, calculating the amount of drive of the table tilting mechanism so that the combined acceleration in the direction of advance of the carriage on the table and acceleration in a direction orthogonal to the direction of advance on the table reduces, and tilting the table.

\* \* \* \* \*